Figure 4:
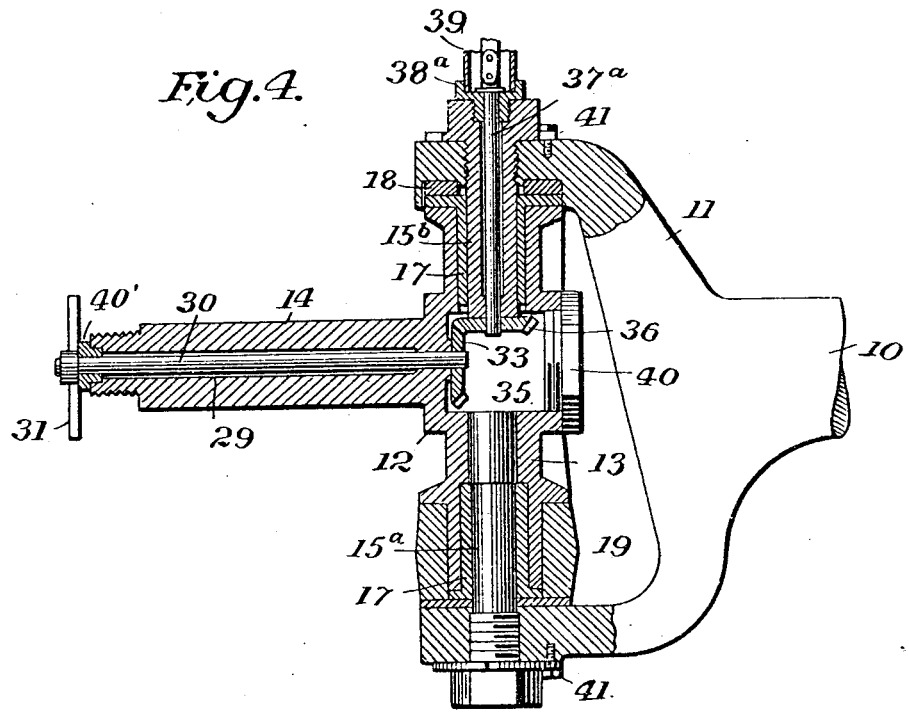

A. LOOMIS.
INDICATOR DRIVING MECHANISM.
APPLICATION FILED MAY 19, 1909.
1,087,171.
Patented Feb. 17, 1914.
2 SHEETS—SHEET 1.
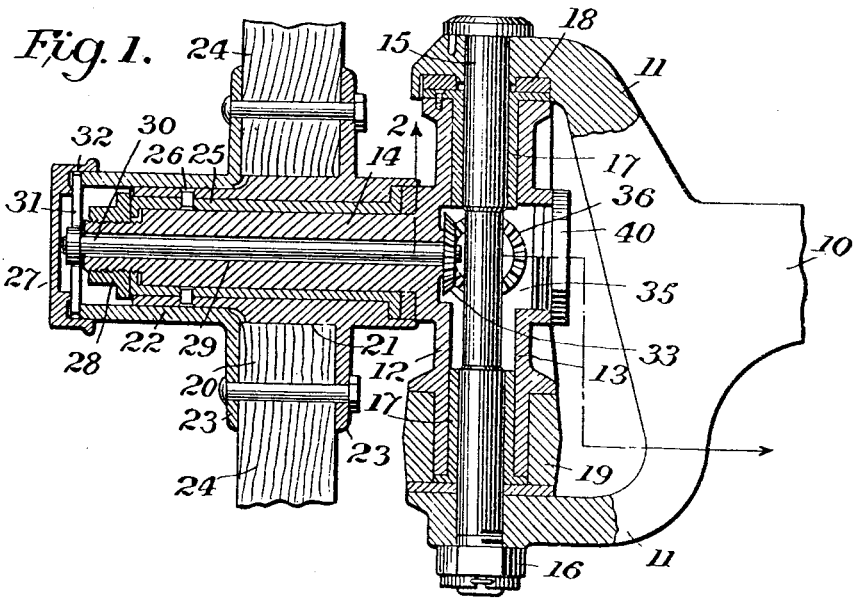
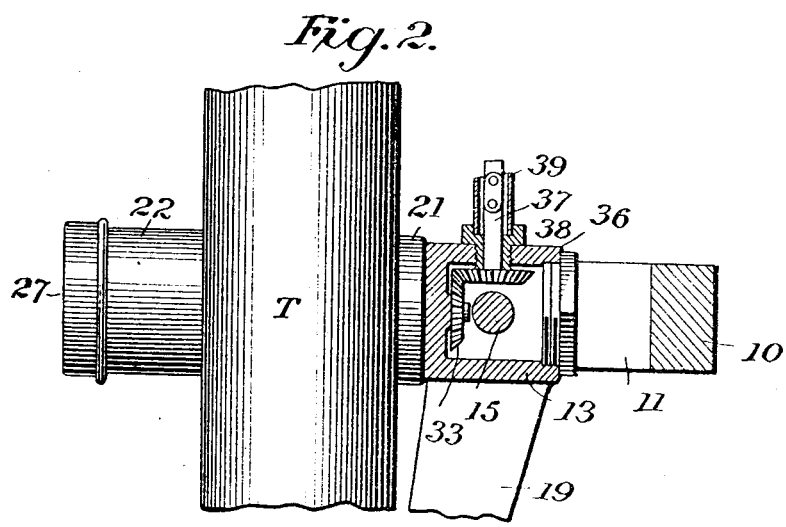
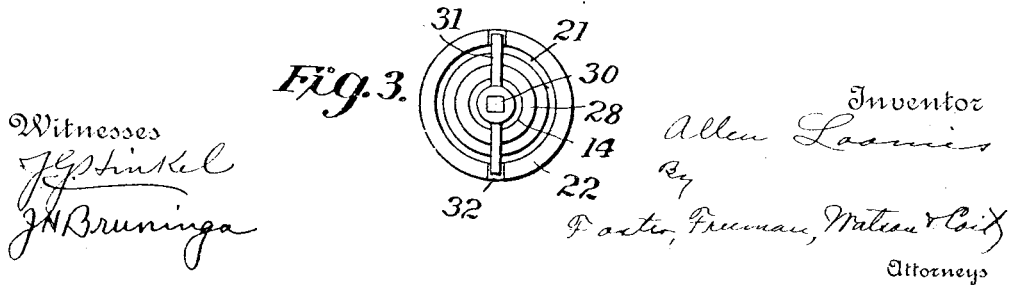

A. LOOMIS.
INDICATOR DRIVING MECHANISM.
APPLICATION FILED MAY 19, 1909.

1,087,171.

Patented Feb. 17, 1914.
2 SHEETS—SHEET 2.

UNITED STATES PATENT OFFICE.

ALLEN LOOMIS, OF DETROIT, MICHIGAN, ASSIGNOR, BY MESNE ASSIGNMENTS, TO PACKARD MOTOR CAR COMPANY, OF DETROIT, MICHIGAN, A CORPORATION OF MICHIGAN.

INDICATOR-DRIVING MECHANISM.

1,087,171.  Specification of Letters Patent.  Patented Feb. 17, 1914.

Application filed May 19, 1909. Serial No. 497,047.

*To all whom it may concern:*

Be it known that I, ALLEN LOOMIS, a citizen of the United States, and resident of Detroit, in the county of Wayne and State of Michigan, have invented certain new and useful Improvements in Indicator-Driving Mechanism, of which the following is a specification.

This invention relates to automobiles and particularly to mechanism for driving indicators such as speedometers, odometers, taximeters, etc. Heretofore these various indicators have been driven from the road wheels of the automobile through a flexible shaft extending from the indicator on the dash to the front wheels where the shaft is connected through a pair of spur gears to the road wheel, one of the gears being mounted directly on the wheel. Thus the gears are necessarily exposed and cannot be lubricated. Aside from the wear thus necessitated the gearing is liable to injury from stones, mud, etc., thrown up from the road.

It is one of the objects of this invention to so construct the indicator driving mechanism that the gears and driving shafts may be entirely inclosed where they may be properly lubricated and be free from external injury.

Another object is to construct such mechanism so that it may be built up with the machine and not necessarily form an accessory which is adapted to be placed on the machine after it has been constructed.

Other objects will appear in the detailed description.

A driving shaft is mounted in and extends through the spindle which is mounted upon the knuckle and connects at the outer end with the hub of the wheel. The inner end of the driving shaft is provided with a gear which meshes with a gear on a driven shaft journaled in the knuckle, this driven shaft being a flexible shaft and connected to the indicator mounted upon the dash. The gears are entirely inclosed by a housing which housing protects the gear against injury and allows the mechanism to be packed in grease. This housing may be a separate housing bolted or otherwise secured to the knuckle or spindle, forming a support for the driving and driven shafts, or the knuckle may be hollow and the gears mounted in the cavity. When the knuckle is of the hollow construction a removable cap is provided whereby the gears and driving shaft may be removed.

In the drawings: Figure 1 is a vertical section through a steering knuckle of an automobile showing one form of this invention embodied therein; Fig. 2 is a part sectional view on the line 2—2 Fig. 1; Fig. 3 is an end view of the outer end of the wheel hub shown in Fig. 1 with the hub cap removed; Fig. 4 is a view similar to Fig. 1 illustrating another form of the invention.

Referring to Figs. 1, 2 and 3: 10 designates a front axle provided with a yoke forming yoke arms 11. A steering knuckle 12, consisting of a body portion 13 and having a spindle 14, is mounted on a pivot pin 15 extending through the knuckle and the yoke arms and secured in place by a nut 16 and cotter pin as shown in Fig. 1. The knuckle is preferably provided with the usual bushings 17, and a thrust ring 18 is provided to transmit the weight of the vehicle to the wheels. The knuckle is provided with an arm 19 which connects with the usual steering mechanism. The road wheel 20 comprises an inner hub member 21, an outer hub member 22, which hub members are provided with flanges 23, 23, and spokes 24 clamped and bolted in place between the flanges 23, 23 by bolts or rivets as shown. The bushing 25 is riveted or otherwise secured to the inner hub member 21 by fastenings 26 and is mounted upon the spindle 14. The usual hub cap 27 is provided which screws on the end of the hub 22, and the nut 28 secures the wheel in place. In Fig. 2, T designates the tire of the road wheel. Through the spindle 14 extends a bore 29 forming a bearing for the driving shaft 30. On the outer end of the driving shaft is mounted a spider 31 provided with radial arms which enter recesses 32 formed in the end of the hub 22. On the inner end of the driving shaft is secured a bevel gear 33 secured in place by a pin. The spider 31, as shown in Fig. 3, is provided with a square hole engaging a similar squared section of the shaft. A pin may be provided for securing the spider to the shaft so as to prevent endwise movement thereof. The knuckle is hollow forming a cavity 35 in which is located the bevel gear 33 referred to and a second meshing bevel gear 36 mounted upon a flexible driven shaft 37 extending to the indicator on the dash. The bevel gear 36 may also be secured to its shaft by means of a suitable pin. The driven shaft 37 is mounted in a removable bushing which is screwed into the knuckle as shown in Fig. 2. The casing 39 for the flexible shaft 37 is provided to protect the same. In order to permit inspection and removal of the gears a removable cap 40 is provided, which cap is screwed into the knuckle.

From the above description it will be seen that all working parts of the driving mechanism are protected and the gears may be packed in grease. Further the gears 33 and 36 may be removed through the opening closed by the cap 40.

In the construction shown in Fig. 4 the knuckle is pivotally mounted upon coaxial pivots 15ª, 15ᵇ screwed into the arms 11 and locked in place by lock screws 41. The pivot pin 15ᵇ is hollow providing a bearing for the flexible shaft 37ª. A bushing 38ª, similar to the bushing 38 shown in Fig. 2, is screwed into the pivot 15ᵇ. The construction of the remaining mechanism is similar to the construction shown in Fig. 1 and is designated by similar reference characters. This construction has certain advantages over the construction shown in Figs. 1, 2 and 3, since the flexible shaft 37ª does not partake of the movement of the steering knuckle. In this construction the indicating mechanism may be mounted directly on the axle, and the shaft 37ª need not necessarily be of a flexible type. As shown in Fig. 4 the spindle may be provided with an end bushing 40′ forming a bearing for the shaft 30. It is obvious that this bushing may be applied to the construction shown in Figs. 1, 2, 3 and 5.

Although this invention is shown as applied to a hub and spindle having the plain bearings it is obvious that this construction may be applied to a hub and a spindle of the roller bearing construction. It will also be noted that certain features of construction may be applied to spindles not mounted on a knuckle.

It is obvious that various changes in the details of construction may be made without departing from this invention and it is therefore to be understood that this invention is not to be limited to the specific construction shown and described.

What I claim is:

1. In a vehicle, the combination with the axle and the steering spindle, of an indicator driving mechanism comprising a shaft extending through said spindle and having a gear on its inner end, means pivotally connecting said spindle to said axle and comprising a vertical pivot bolt arranged wholly below said shaft, and an indicator driving shaft having a gear in mesh with said first-mentioned gear.

2. In a vehicle, the combination with the axle and the steering spindle, of an indicator driving mechanism comprising a shaft extending through said spindle and having a gear on its inner end, means pivotally connecting said spindle to said shaft and comprising a pair of vertically arranged pivot bolts having their inner ends spaced apart and out of alinement with said shaft, and an indicator shaft having a gear in mesh with said first-mentioned gear.

3. In a vehicle, the combination with the axle and the steering spindle, of an indicator driving mechanism comprising a shaft extending through said spindle and having a gear on its inner end, means at the outer end of said shaft for driving the same, means pivotally connecting said spindle and said axle and comprising a pair of alined pivot bolts arranged in a vertical plane with the axis of said shaft and having their inner ends spaced apart and out of alinement with said shaft, and an indicator driving shaft having a gear in mesh with said first-mentioned gear.

4. In a vehicle, the combination with a hollow steering knuckle having a spindle, a bearing in the spindle and a road wheel mounted thereon, of an indicator driving mechanism including a driving shaft journaled in the bearing, a driven shaft at an angle to the driving shaft and journaled in the knuckle, intermeshing gears on the shafts and located within the knuckle, a removable bearing sleeve for the driven shaft, and a detachable connection between the driving shaft and the wheel.

5. In a vehicle, the combination with a pivoted steering knuckle having a spindle and a road wheel on said spindle, of an indicator driving mechanism having a part extending through the knuckle pivot, and a connection between said part and the wheel.

6. In a vehicle, the combination with a pivoted steering knuckle having a spindle and a road wheel mounted on the spindle, of an indicator driving mechanism including a driven shaft journaled longitudinally in the knuckle pivot, and an operative connection between the shaft and the wheel.

7. In a vehicle, the combination with a pivoted steering knuckle having a spindle and a road wheel mounted on the spindle, of an indicator driving mechanism including a driven shaft journaled longitudinally in the knuckle pivot, a driving shaft journaled in the spindle, a driving connection between the shafts, and a connection between the driving shaft and the wheel.

8. In a vehicle, the combination with a pivoted hollow steering knuckle having a spindle and a road wheel mounted on the spindle, of an indicator driving mechanism including a driving shaft journaled in the spindle, a driven shaft journaled longitudinally in the knuckle pivot, intermeshing gears on the shafts and both within the knuckle, and a connection between the driving shaft and the wheel.

9. In a vehicle, the combination with a pivoted steering knuckle having a spindle and a road wheel mounted on the spindle, of an indicator driving mechanism including a shaft journaled longitudinally in the knuckle pivot, a removable bushing for the shaft, and an operative connection between the shaft and the wheel.

10. In a vehicle, the combination with a pivoted hollow steering knuckle having a spindle and a road wheel mounted on the spindle, of an indicator driving mechanism including a driving shaft journaled in the spindle, a driven shaft journaled longitudinally in the knuckle pivot, intermeshing gears on the shafts both mounted within the knuckle, a removable bushing for the driven shaft, a detachable connection between the driven shaft and the wheel, and a removable cap for the knuckle located opposite the gears.

11. In a vehicle, the combination with a hollow steering knuckle having a spindle and a knuckle pivot, and a road wheel on said spindle, of an indicator driving mechanism housed in said knuckle having a shaft extending longitudinally of said pivot, and a connection between said shaft and the road wheel.

12. In a vehicle, the combination with a hollow steering knuckle having a spindle and a knuckle pivot, and a road wheel on said spindle, of an indicator driving mechanism including shafts extending longitudinally of said spindle and pivot respectively, and gears connecting said shafts and housed in said knuckle.

13. The combination with an axle, a steering knuckle pivoted thereto, and a wheel hub journaled on the spindle of said knuckle, of a speedometer drive comprising a rotary shaft carried by and partaking of all of the movements of said axle, but with the said knuckle free for pivotal movements independently of movements of said axle and rotary shaft, whereby the said shaft is free from the pivotal movements of said knuckle.

14. The combination with an axle, a steering knuckle pivoted thereto and a wheel hub journaled on the spindle of said knuckle, of a swivel acting speedometer drive applied in part to said knuckle and in part to said axle, and comprising a rotary shaft carried by and partaking of the movements of said axle, but with the said knuckle free for pivotal movements independently of movements of said axle and rotary shaft, whereby the said rotary shaft is free from the pivotal movements of said knuckle.

In testimony whereof I affix my signature in presence of two witnesses.

ALLEN LOOMIS.

Witnesses:
C. I. DALE,
E. H. KING.